Patented July 18, 1950

2,515,942

UNITED STATES PATENT OFFICE 2,515,942

PHOTOSENSITIVE GLASS CONTAINING PALLADIUM

Stanley Donald Stookey, Corning, N. Y., assignor to Corning Glass Works, Corning, N. Y., a corporation of New York No Drawing. Application April 5, 1948, Serial No. 19,179

17 Claims. (Cl. 49—92)

This invention relates to photosensitive glasses, batches therefor, and articles produced therefrom. By photosensitive glass is meant a glass which is so changed by exposure to short wave length radiations, such as X-ray or ultra violet radiations, that exposed areas are capable of thermally developed coloration while unexposed areas remain substantially unaffected.

Photosensitive glasses which contain gold, silver or copper as sensitizing agents are disclosed in my pending applications Serial Numbers 513,443, 513,444 and 513,445 filed December 8, 1943, and pending application Serial Number 513,441 filed by William H. Armistead December 8, 1943, all assigned to the assignee of this application. Serial Number 513,445 also discloses photosensitive glasses which contain sufficient fluoride to be thermally opacifiable and at the same time contain gold, silver or copper as sensitizing agents. By thermally opacifiable glass is meant a clear glass which can be opacified by heating to 500–600° C.

Blue, yellow, orange, red and purple are the only colors that can be produced in prior photosensitive glasses and one of the objects of my invention is to produce photosensitive glasses capable of having developed therein colors differing from those which may be developed in prior glasses.

Another object is to provide batches from which these new glasses may be melted.

A further object is to provide thermally opacifiable glasses in which the new photosensitive colors may be developed.

A still further object is to widen the range of photosensitive colors available in glass.

Still another object is to provide a glass article which has a picture or design produced therein by photosensitive means in colors hitherto unavailable with either a transparent or opal background.

Another object is to provide a suitable fining agent for the new photosensitive glasses which also enhances their photosensitivity.

A further object is to provide a photosensitive glass containing palladium and articles made therefrom which are selectively colored by the palladium.

Another object is to increase the solubility of palladium in glass.

My invention accomplishes these and other objects by introducing, as sensitizing agents, small amounts of palladium and either gold or silver into a silicate glass batch. It is highly desirable, although not essential, that small amounts of cerium oxide or antimony oxide or both be present in the glass batch. When such a batch is melted a glass is produced which, when exposed to ultraviolet radiations through a photographic negative and subsequently heated, contains a brown colored picture or design exhibiting photographic detail.

The sensitizing agents, palladium, gold and silver, are introduced into the batch as salts or compounds of the respective metals, preferably as the chloride although any other salts may be used. The salts are decomposed during the melting of the batch. It is thought that the sensitizing agents exist as metal ions in the finished glass, but it is not known in exactly what state the metal exists before irradiation and heating of the glass. However, there is strong evidence that the coloration resulting from irradiation and heating is due to colloidal metallic palladium and in some instances also to the additional presence of colloidal gold or silver dispersed in the glass.

Palladium is not of itself photosensitive in glass, but it is activated by and requires the presence of either gold or silver. Any amount of palladium up to 0.02% is effective and the smallest appreciable amount will accomplish at least some of the benefits of the invention. Very small amounts of palladium, say up to 0.001% produce a brownish modification of the colors normally produced by gold or silver. Larger amounts produce a distinct brown coloration. Since 0.02% is the limit of solubility of palladium in silicate glass, amounts in excess of this are not of value in the glass.

All percentages used herein are based on the final glass composition as theoretically calculated from the batch.

Gold is effective as a sensitizer from the smallest appreciable amounts up to 0.1%. Larger amounts may be present but serve no useful purpose and are wasteful. Between 0.01% and 0.03% of gold represents the most economical amounts capable of producing highly desirable results and is therefore to be preferred.

Silver likewise functions as a sensitizer in all amounts up to 0.03% calculated as silver chloride. Larger amounts render the glass non-photosensitive and should be avoided.

Cerium oxide may be employed in amounts up to 0.05% and it increases the photosensitivity of the glass or decreases its exposure time by a maximum of ten fold. By exposure time is meant the time in which a given effect is produced by a given irradiation. Amounts greater than 0.05% cerium oxide are detrimental to the photosensitivity. Cerium oxide also acts to increase the solubility of palladium twenty fold or more and thus makes possible more intense colors. While the effect of smaller amounts of cerium oxide is not as great, marked improvement is produced even by traces.

Antimony oxide, even in minute amounts, markedly increases the photosensitivity of the glass and up to 0.1% can be used to advantage. Larger amounts are detrimental to the photosensitivity and are to be avoided. Antimony oxide also is particularly effective in fining the glass, that is, in removing gas bubbles formed during melting.

The presence of substances having a reducing effect is to be avoided and the batch is preferably kept highly oxidized by the addition of oxidizing agents such as niter. Therefore copper can not be used as a sensitizing agent with palladium since it is ineffective except in a reduced glass.

Ultraviolet-absorbing impurities such as oxides of arsenic, iron, manganese, vanadium, selenium, thallium and uranium inhibit photosensitivity and should be absent. Lead oxide in amounts greater than about 2% likewise should be absent. With these exceptions silicate glasses in general are effective for the purposes of the invention.

As examples of glass compositions illustrating but not limiting the invention the following batches in parts by weight are given:

*Table I*

| | I | II | III | IV |
|---|---|---|---|---|
| Sand | 100 | 100 | 100 | 100 |
| $Na_2CO_3$ | 24 | 24 | 27 | 27 |
| $NaNO_3$ | 8.5 | 8.5 | 3.5 | 4 |
| $K_2CO_3$ | 6 | 6 | 6 | 6 |
| $BaCO_3$ | 15 | 15 | 15 | 15 |
| $Al_2O_3$ | 5 | 5 | 4 | 3 |
| $Na_3AlF_6$ | 3.5 | 3.5 | 2.5 | 2 |
| Au | 0.035 | 0.035 | 0.014 | 0.038 |
| Pd | 0.0035 | 0.014 | 0.0035 | 0.011 |
| $CeO_2$ | 0.07 | 0.07 | 0.07 | 0.055 |
| $Sb_2O_3$ | 0.035 | 0.035 | 0.035 | -------- |

| | V | VI | VII | VIII | IX |
|---|---|---|---|---|---|
| Sand | 100 | 100 | 100 | 100 | 100 |
| $Na_2CO_3$ | 27 | 41 | 41 | 27 | 28 |
| $NaNO_3$ | 4 | 4 | 4 | 4 | 8 |
| $K_2CO_3$ | 6 | -------- | -------- | 6 | -------- |
| $BaCO_3$ | 15 | -------- | -------- | 15 | 14 |
| $CaCO_3$ | -------- | 21 | 21 | -------- | -------- |
| $Al_2O_3$ | 3 | 3 | 3 | 3 | 16 |
| $Na_3AlF_6$ | 2 | -------- | -------- | 2 | -------- |
| Borax | -------- | -------- | -------- | -------- | 2⅓ |
| $Na_2SiF_6$ | -------- | -------- | -------- | -------- | 7 |
| Au | 0.0385 | 0.036 | 0.036 | -------- | 0.023 |
| Pd | 0.011 | 0.0068 | 0.0091 | 0.0069 | 0.0029 |
| $CeO_2$ | 0.055 | 0.06 | 0.06 | 0.055 | 0.059 |
| $Sb_2O_3$ | 0.055 | -------- | -------- | -------- | 0.059 |
| AgCl | -------- | -------- | -------- | 0.028 | -------- |

Example IX shows a batch containing sufficient fluorine to form a thermally opacifiable glass when melted at about 1350° C. in an open crucible for about five hours. If the clear glass thus obtained is exposed through a photographic negative to carbon arc ultraviolet radiations and subsequently heated to about 600° C., the resulting article will be opacified with the exposed areas forming a brown picture and the unexposed areas a white opal background. It is not possible to state the exact amount of fluorine necessary in all cases as this varies with the base glass, the melting unit used, the source of fluoride and other factors, as is well known in the glass making art. The proper amount is easily determined by trial.

While the above examples show preferred embodiments, my invention applies to silicate glasses in general, within the restrictions set forth previously. It has been found, however, that the presence of an oxide of a metal of the second periodic group and of barium oxide in particular produces glasses of superior photosensitivity. Although only CaO and BaO are shown in the examples other second periodic group oxides may be substituted therefor with substantially the same effect.

The invention further embodies the production of a brown coloration in various shades of photosensitive brown and modifications of known photosensitive colors. In general when the palladium content is less than 0.001% and the gold or silver content is near its maximum, the characteristic colors of gold or silver predominate but are of a brownish hue. Larger amounts of palladium result in a definite brown color varying in intensity. Likewise changes in the cerium oxide and antimony oxide contents appreciably affect the color. Table II illustrates a few of the possible variations.

*Table II*

| | I | II | III | IV | V | VI | VII | VIII |
|---|---|---|---|---|---|---|---|---|
| Sand | 100 | 100 | 100 | 100 | 100 | 100 | 100 | 100 |
| $Na_2CO_3$ | 24 | 24 | 24 | 24 | 24 | 24 | 24 | 24 |
| $NaNO_3$ | 8.5 | 8.5 | 8.5 | 8.5 | 8.5 | 8.5 | 8.5 | 8.5 |
| $K_2CO_3$ | 6 | 6 | 6 | 6 | 6 | 6 | 6 | 6 |
| $BaCO_3$ | 15 | 15 | 15 | 15 | 15 | 15 | 15 | 15 |
| $Al_2O_3$ | 5 | 5 | 5 | 5 | 5 | 5 | 5 | 5 |
| $Na_3AlF_6$ | 3.5 | 3.5 | 3.5 | 3.5 | 3.5 | 3.5 | 3.5 | 3.5 |
| Au | 0.035 | 0.035 | 0.035 | 0.035 | 0.035 | 0.035 | 0.035 | 0.035 |
| Pd | 0.0009 | 0.0017 | 0.0026 | 0.0035 | 0.0026 | 0.0026 | 0.0026 | 0.0026 |
| $CeO_2$ | 0.07 | 0.07 | 0.07 | 0.07 | 0.07 | 0.07 | 0.07 | 0.07 |
| $Sb_2O_3$ | 0.035 | 0.035 | 0.035 | 0.035 | -------- | 0.07 | 0.10 | 0.14 |

The glasses of Examples I to IV vary in color, after developing, from a brown-tinted purple to a definite brown, due to increasing palladium content. Example V will produce a nearly neutral gray with a slight predominance of blue. The glass of Example III which develops a purplish brown color differs from that of Example V only in antimony oxide content. Glasses from Examples VI, VII and VIII are well fined glasses and have produced in them chocolate brown colors of increasing intensity as the antimony oxide content increases. The wide possibilities for color variation that my new glasses present are apparent from these examples.

In making articles from the photosensitive glasses of this invention I have found it convenient to employ a carbon arc, in which the carbons have a core of ultraviolet emitting material such as cerium oxide, as a source of radiation, although other known types of ultraviolet radiators may be used, such as a quartz-mercury arc. The length of exposure time and the distance between glass and radiation source may be varied widely and serve to control the intensity of the photosensitive color and the depth of penetration. The amount of sensitive materials present is likewise a factor and all three conditions must be considered. For example, I have found that glasses melted from batches shown in Examples IV and V, Table I, exposed for a period of 5 minutes at a distance of 10 inches and subsequently heat developed at 600° C. produce a brown color with good contrast.

The term "oxidized silicate glass," as used in the claims, means a glass, prepared by fusion of raw glassmaking materials under oxidizing conditions, preferably in the presence of an oxidizing agent such as $NaNO_3$, containing on the oxide basis a major proportion of silica and a minor proportion of an alkali metal oxide such as $Na_2O$ or mixtures of $Na_2O$ and $K_2O$, preferably containing a minor proportion of an oxide of a metal of the second periodic group such as BaO or CaO and a minor proportion of $Al_2O_3$, optionally containing a minor proportion of another conventional glass-forming oxide such as $B_2O_3$ or PbO, and, if desired, containing sufficient fluorine to render the glass thermally opacifiable, but being free of constituents which inhibit photosensitivity including compounds of arsenic, iron, manganese, vanadium, selenium, thallium, and uranium and also over 2% PbO.

I claim:

1. A photosensitive glass consisting essentially of an oxidized silicate glass containing, on the oxide basis by weight, up to 0.02% palladium computed as Pd and the indicated proportion of a photosensitizing agent selected from the group consisting of up to 0.1% gold computed as Au and up to 0.03% silver computed as AgCl.

2. A photosensitive glass consisting essentially of an oxidized silicate glass containing, on the oxide basis by weight, up to 0.02% palladium computed as Pd, the indicated proportion of a photosensitizing agent selected from the group consisting of up to 0.1% gold computed as Au and up to 0.03% silver computed as AgCl, and up to 0.05% $CeO_2$.

3. A photosensitive glass consisting essentially of an oxidized silicate glass containing, on the oxide basis by weight, up to 0.02% palladium computed as Pd. up to 0.1% gold computed as Au, and up to 0.05% $CeO_2$.

4. A photosenistive glass consisting essentially of an oxidized silicate glass containing, on the oxide basis by weight, up to 0.02% palladium computed as Pd. up to 0.03% silver computed as AgCl, and up to 0.05% $CeO_2$.

5. A photosensitive glass consisting essentially of an oxidized silicate glass containing, on the oxide basis by weight, up to 0.02% palladium computed as Pd. the indicated proportion of a photosensitizing agent selected from the group consisting of up to 0.1% gold computed as Au and up to 0.03% silver computed as AgCl, up to 0.05% $CeO_2$, and up to 0.1% antimony oxide computed as $Sb_2O_3$.

6. A photosensitive glass consisting essentially of a thermally opacifiable fluorine-containing oxidized silicate glass containing, on the oxide basis by weight, up to 0.02% palladium computed as Pd, the indicated proportion of a photosensitizing agent selected from the group consisting of up to 0.1% gold computed as Au and up to 0.03% silver computed as AgCl, and up to 0.05% $CeO_2$.

7. An article comprising a body of irradiated, substantially colorless photosensitive glass consisting essentially of an oxidized silicate glass containing, on the oxide basis by weight, up to 0.02% palladium computed as Pd and the indicated proportion of a photosensitizing agent selected from the group consisting of up to 0.1% gold computed as Au and up to 0.03% silver computed as AgCl, said glass body containing within its mass a predetermined latent photographic image capable of being developed, by uniform heating of the entire glass body, into a visible colored image exhibiting photographic detail.

8. An article comprising a body of irradiated, substantially colorless photosensitive glass consisting essentially of an oxidized silicate glass containing, on the oxide basis by weight, up to 0.02% palladium computed as Pd, the indicated proportion of a photosensitizing agent selected from the group consisting of up to 0.1% gold computed as Au and up to 0.03% silver computed as AgCl, and up to 0.05% $CeO_2$, said glass body containing within its mass a predetermined latent photographic image capable of being developed, by uniform heating of the entire glass body, into a visible colored image exhibiting photographic detail.

9. An article comprising a glass body made of a photosensitive glass consisting essentially of an oxidized silicate glass containing, on the oxide basis by weight, up to 0.02% palladium computed at Pd and the indicated proportion of a photosensitizing agent selected from the group consisting of up to 0.1% gold computed as Au and up to 0.03% silver computed as AgCl, selected portions of said glass body being colored by the photosensitizing agent and the palladium to form within its mass a heat-stable image exhibiting photographic detail.

10. An article comprising a glass body made of a photosensitive glass consisting essentially of an oxidized silicate glass containing, on the oxide basis by weight, up to 0.02% palladium computed as Pd, the indicated proportion of a photosensitizing agent selected from the group consisting of up to 0.1% gold computed as Au and up to 0.03% silver computed as AgCl, and up to 0.05% $CeO_2$, selected portions of said glass body being colored by the photosensitizing agent and the palladium to form within its mass a heat-stable image exhibiting photographic detail.

11. An article comprising a glass body made of a photosensitive glass consisting essentially of an oxidized silicate glass containing, on the oxide basis by weight, up to 0.02% palladium computed as Pd, up to 0.1% gold computed as Au, and up to 0.05% $CeO_2$, selected portions of said glass body being colored by the photosensitizing agent and the palladium to form within its mass a heat-stable image exhibiting photographic detail.

12. An article comprising a glass body made of a photosensitive glass consisting essentially of an oxidized silicate glass containing, on the oxide basis by weight, up to 0.02% palladium computed as Pd, up to 0.03% silver computed as AgCl, and up to 0.05% $CeC_2$, selected portions of said glass body being colored by the photosensitizing agent and the palladium to form within its mass a heat-stable image exhibiting photographic detail.

13. An article comprising a glass body made of a photosensitive glass consisting essentially of an oxidized silicate glass containing, on the oxide basis by weight, up to 0.02% palladium computed as Pd, the indicated proportion of a photosensitizing agent selected from the group consisting of up to 0.1% gold computed as Au and up to 0.03% silver computed as AgCl, up to 0.05% $CeO_2$, and up to 0.1% antimony oxide computed as $Sb_2O_3$, selected portions of said glass body being colored by the photosensitizing agent and the palladium to form within its mass a heat-stable image exhibiting photographic detail.

14. An article comprising a glass body made of a photosensitive glass consisting essentially of a thermally opacified fluorine-containing oxidized silicate glass containing, on the oxide basis by weight, up to 0.02% palladium computed as Pd, the indicated proportion of a photosensitizing agent selected from the group consisting of up to 0.1% gold computed as Au and up to 0.03% silver computed as AgCl, and up to 0.05% $CeO_2$, selected portions of said glass body being colored by the photosensitizing agent and the palladium to form within its mass a heat-stable image exhibiting photographic detail against an opacified background.

15. The method of imparting a brownish hue to the colors produced in a photosensitive glass consisting essentially of an oxidized silicate glass containing, on the oxide basis by weight, the indicated proportion of a photosensitizing agent selected from the group consisting of up to 0.1% gold computed as Au and up to 0.03% silver computed as AgCl, which includes the step of incorporating up to 0.02% palladium computed as Pd in the glass.

16. The photosensitive glass as claimed in claim 3, wherein the gold content computed as Au ranges from 0.01% to 0.03%.

17. The article as claimed in claim 11, wherein the gold content of the photosensitive glass ranges from 0.01% to 0.03%.

STANLEY DONALD STOOKEY.

No references cited